United States Patent
Mathur

(12) 
(10) Patent No.: US 6,424,658 B1
(45) Date of Patent: Jul. 23, 2002

(54) STORE-AND-FORWARD NETWORK SWITCH USING AN EMBEDDED DRAM

(75) Inventor: Harish N. Mathur, San Jose, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/251,721

(22) Filed: Feb. 17, 1999

Related U.S. Application Data

(63) Continuation-in-part of application No. 09/240,726, filed on Jan. 29, 1999, now Pat. No. 6,308,220.

(51) Int. Cl.[7] .......................... H04L 12/54; H04L 12/56
(52) U.S. Cl. ...................... 370/429; 370/412; 370/413; 370/422; 370/423; 370/428; 370/912; 711/104; 711/105; 711/173
(58) Field of Search ................................. 370/351, 389, 370/412, 413, 422, 423, 428, 429, 912; 711/100, 101, 104, 105, 147, 149, 153, 170, 173

(56) References Cited

U.S. PATENT DOCUMENTS

| | | | | |
|---|---|---|---|---|
| 5,371,870 A | * | 12/1994 | Goodwin et al. ........... 395/425 |
| 5,521,923 A | | 5/1996 | Willmann et al. |
| 5,555,264 A | | 9/1996 | Sallberg et al. |
| 5,610,921 A | * | 3/1997 | Christensen ................ 370/395 |
| 5,625,625 A | | 4/1997 | Oskouy et al. ............. 370/395 |
| 5,633,865 A | | 5/1997 | Short ......................... 370/412 |
| 5,633,876 A | | 5/1997 | Dinkins ...................... 370/315 |
| 5,703,806 A | | 12/1997 | Puar et al. .................. 365/181 |
| 5,704,059 A | * | 12/1997 | Ohno .......................... 395/515 |
| 5,734,921 A | * | 3/1998 | Dapp et al. ............... 395/800.1 |
| 5,740,175 A | | 4/1998 | Wakeman et al. .......... 370/422 |
| 5,742,765 A | * | 4/1998 | Wong et al. ............. 395/200.6 |
| 5,802,054 A | | 9/1998 | Bellenger .................... 370/401 |
| 5,809,024 A | | 9/1998 | Ferguson et al. ........... 370/395 |
| 5,854,792 A | | 12/1998 | Konishi et al. ............. 370/428 |
| 5,864,539 A | | 1/1999 | Yin ............................. 370/236 |
| 5,926,473 A | * | 7/1999 | Gridley ....................... 370/389 |
| 5,963,745 A | * | 10/1999 | Collins et al. .......... 395/800.13 |
| 5,963,746 A | * | 10/1999 | Barker et al. ............. 395/800.2 |
| 6,011,798 A | * | 1/2000 | McAlpine .................... 370/395 |
| 6,094,715 A | * | 7/2000 | Wilkinson et al. ........... 712/20 |
| 6,122,279 A | * | 9/2000 | Milway et al. .............. 370/395 |
| 6,125,421 A | * | 9/2000 | Roy ............................... 711/5 |
| 6,141,336 A | * | 10/2000 | Bauchot et al. .............. 370/348 |
| 6,157,978 A | * | 12/2000 | Ng et al. ..................... 710/240 |
| 6,205,149 B1 | * | 3/2001 | Lemaire et al. ............. 370/401 |
| 6,308,220 B1 | * | 10/2001 | Mathur ........................ 709/238 |

OTHER PUBLICATIONS

ACD80800 Address Resolution Logic Data Sheet. Advanced Communication Devices, Jul. 1998.
"A Day in the Life of an LS Packet" Application note, I–Cube, Oct. 1997, pp. 1–19.

* cited by examiner

*Primary Examiner*—Hassan Kizou
*Assistant Examiner*—Joe Logsdon
(74) *Attorney, Agent, or Firm*—Stuart T. Auvinen

(57) ABSTRACT

A store-and-forward network switch uses an embedded dynamic-random-access memory (DRAM) packet memory. An input port controller receiving a packet writes the packet to the embedded packet memory. The input port controller then sends a message to the output port over an internal token bus. The message includes the row address in the embedded packet memory where the packet was written and its length. The output port reads the message and reads the packet from the embedded memory at the row address before transmitting the packet to external media. Packets are stored at row boundaries so that DRAM page-mode cycles predominate. Only one packet is written to each DRAM row or page. Thus the column address is not sent between ports with the message sent over the token bus. A routing table can also be included in the embedded DRAM.

20 Claims, 9 Drawing Sheets

STORE-AND-FORWARD NETWORK SWITCH USING AN EMBEDDED DRAM

RELATED APPLICATION

This application is a continuation-in-part of the application for "Circulating Parallel-Search Engine with Random Inputs for Network Routing Table Stored in a Wide Embedded DRAM", U.S. Ser. No. 09/240,726, filed Jan. 29, 1999, now U.S. Pat. No. 6,308,220.

FIELD OF THE INVENTION

This invention relates to computer-network switches, and more particularly for store-and-forward network switches using embedded memory.

BACKGROUND OF THE INVENTION

Computer networks have been a key technology to unlock the power of low-cost personal computers (PCs). Networks allow PCs and work stations to share data and resources and facilitate communication among co-workers. While individual PCs may have limited resources, by linking a PC to a network, vast additional resources become easily available.

Computers, printers, and other network elements are often connected together at a lowest level by a local-area network (LAN) such as an Ethernet. FIG. 1A illustrates a prior-art LAN using a single collision domain. Network elements 12 include PCs and peripherals such as a workgroup printer. Each network element 12 contains a network-interface card (NIC) or equivalent that connects to the physical media, usually twisted-pair cable. While LAN 10 is often depicted as a single cable, often a repeater or hub is used. The cable from each network element 12 is plugged into the repeater box (not shown). The repeater then replicates a signal transmitted from one network element 12 to all other network elements 12 so that all network elements 12 receive the same transmission.

Sometimes two network elements 12 transmit at the same time. A collision results where the two transmissions interfere with each other and the correct data cannot be reliably read. Transmission must stop and be re-started at different times. These collisions become more frequent as more network elements 12 are added to LAN 10, and as network traffic increases.

Since each transmission is repeated to all other network elements 12 on LAN 10, LAN 10 contains a single collision domain. Performance of LAN 10 is limited by collisions. Often a corporate network must be divided into many small LANs to limit collisions. Bridge 14 or a router is used to connect LAN 10 to other LANs or to a backbone network or wide-area network (WAN).

Network Switch—FIG. 1B

More recently, network switches have been used to connect LANs to other LANs, and even to connect network elements within a single LAN. FIG. 1B shows a LAN using a network switch to avoid large collision domains. Network elements 12 connect to switch 16 rather than to a repeater or hub. Each network element 12 is bi-directional (full-duplex) and is shown twice, once as an input to switch 16 and again as an output from switch 16, but in reality each network element is a single element.

Switch 16 monitors the inputs from each network element 12, looking for a transmission. When a transmission to switch 16 is detected, the packet is parsed to determine the destination port. Switch 16 then makes a temporary connection from the input port to the output port and sends the packet to the destination port. The packet is sent only to the destination port and not to the other output ports.

Switch 16 contains a switch fabric that allows multiple connections to be made at the same time. For example, input port (network element) A can send a packet to output port C, while input port B sends a packet to output port D. A collision does not occur even though both network elements A and B are transmitting at the same time. Switch 16 effectively creates separate collision domains for each pair of network elements during a packet transmission.

Switch 16 can eliminate collisions, or break a network into smaller collision domains when entire LANs rather than single network elements are connected to the ports of switch 16. Thus switches have become immensely popular as a way to easily improve network performance.

The original 10 Mbps Ethernet (10 Base-T) is being replaced with 100 Mbps Ethernet, and 1 Gbps Ethernet is expected. The higher speed networks require that the switches also transfer data at the higher rate to avoid congestion. The switches must also set up and tear down connections more rapidly.

Often the switch fabric in network switches consists of a crossbar switch, which can simply be a matrix of transistor switches that connect each input port to every other output port. These crossbar switches are fast, but as more ports are added, the switch matrix grows exponentially as each new port must connect to all other ports. Thus switches with larger numbers of ports are expensive.

S/F Switch Limited by Memory Bandwidth

Switches can also use a store-and-forward architecture. Incoming packets are stored in a memory and later read out to the output port. No switch matrix or crossbar switch is required. These store-and-forward switches can more easily add ports. However, memory bandwidth limits the speed and number of ports of these switches.

For example, the maximum throughput for a store-and-forward switch is when one half of the ports (n/2) are talking to the other half of the ports at full speed. The network speed is V (Mbps) per direction, the direction number is D (1=half duplex, 2=full duplex), and the number of memory access cycles A is 2, one cycle to write and one cycle to read. The required memory bandwidth S (Mbps) is:

$$S = (n/2) * D * V * A \text{ Mbps}$$

For example when n=8 ports, V=100 Mbps, D=2 (full duplex), A=2 cycles, then:

$$S = (8/2) * 2 * 100 * 2$$
$$= 1,600 \text{ Mbps}$$
$$= 1.6 \text{ Gbps}$$
$$= 200 \text{ Mbytes/sec.}$$

The memory must have a bandwidth of 200 M bytes/sec for a non-blocking switch with just 8 ports. In another example, a switch has 24 100 Mpbs ports and 2 Gbps ports. Then n=24 ports with V=100 Mbps, and n=2 ports with V=1 Gbps. D=2 for full duplex, A=2, then:

$$S = (24/2) * 2 * 100 * 2 + (2/2) * 2 * 1000 * 2$$
$$= 4800 + 4000 \text{ Mbps}$$

= 8.8 Gbps

= 1.1 Gbytes/sec

A very fast memory with a 10-nanosecond access time must have a data-bus width of nearly 100 bits to meet such a bandwidth requirement. Including ground and control pins, a switch-controller integrated circuit (IC) or chip would require 150 pins just for the memory interface. The 26 ports would require another 150 pins. The switch-controller chip could easily surpass 400 pins, making it very expensive. Using multiple chips further increases cost, power dissipation, and complexity of the switch system.

As network speeds increase to 100 MBps and especially 1 Gbps and beyond, store-and-forward network switches face severe technical limitations. Expensive static random-access memory (SRAM) has fast access, but larger packets require larger memory sizes. Slower dynamic-random-access memory (DRAM) may be used to store larger packets, but it may not offer fast access times and sufficient bandwidth. Increasing bandwidth requirements for faster network speeds and additional switch ports increases pin-count and cost of switch controller chips.

Embedded-DRAM Graphics Display Systems

The assignee has recognized the problem of bottlenecks to external dynamic-random-access memory (DRAM) in graphics display systems, and has pioneered embedded DRAM for graphics controllers. See for example: Puar et al., "Graphics Controller Integrated Circuit Without Memory Interface", U.S. Pat. Nos. 5,650,955 and 5,703,806. These embedded-DRAM graphics controllers have been used predominantly for portable PC's such as laptop and notebook PCs.

Although graphics controllers are in a different technical field than network switches, the inventor has realized that such embedded DRAM technology could solve performance and cost problems for network switches. While many view embedded DRAM technology as useful only for portable systems, the inventor realizes that computer-network switches and routers could benefit from the performance and cost improvement of embedded DRAM.

What is desired is a network switch for higher network speeds. It is desired to add ports without significantly increasing the cost of the switch. A network switch with a large number of high-speed ports is desired. It is desired to avoid increasingly larger numbers of pins on a network-switch chip as higher network speeds are used and higher s memory bandwidth is required. A high memory-bandwidth network switch is desired. A store-and-forward network switch with sufficient memory bandwidth and high port count for Gigabit networks is desired.

SUMMARY OF THE INVENTION

A network switch chip has a plurality of input ports connected to external network nodes to receive packets. A plurality of output ports is connected to external network nodes. The output ports transmit the packets to the external network nodes.

An embedded packet memory temporarily stores packets received from the input ports for transfer to the output ports for transmission. The embedded packet memory is a dynamic-random-access memory (DRAM) organized into rows and columns.

An internal data bus is coupled to the embedded packet memory. It writes packets from the input ports to the embedded packet memory and reads the packets from the embedded packet memory to the output ports. The internal data bus is an internal bus without connection to external pins of the network switch chip during normal operating modes when packets are transmitted from input ports to output ports.

Port controllers are coupled to the input ports and the output ports. They detect packets received at an input port and write the packet into the embedded packet memory over the internal data bus. They also read the packet from the embedded packet memory to an output port.

A message bus is coupled to the port controllers. It sends a message from a port controller for an input port that receives a packet to a port controller for an output port that is a destination indicated by the packet. The message causes the port controller for the output port to read the packet from the embedded packet memory. Thus packets are switched from an input port to an output port by being written to and read from the embedded packet memory using the internal data bus in response to the message sent over the message bus.

In further aspects of the invention the message bus is further for sending an acknowledgement message from the port controller for the output port to the port controller for the input port when a packet has been read from the embedded packet memory. The port controller for the input port releases a memory space occupied by the packet in response to the acknowledgement message. Thus memory space in the embedded packet memory is released when the acknowledgement message is sent over the message bus.

In further aspects the port controller for the input port writes an entire packet to a row of the embedded packet memory without interruption by other port controllers. Page-mode accesses to a same row in the embedded packet memory are faster than page-miss accesses to a different row in the embedded packet memory. Thus the packet is written to the row in the embedded packet memory using mostly faster page-mode accesses.

In further aspects the internal data bus is a wide bus having at least 256 data bits. The internal data bus transfers at least 32 bytes of data for each memory-access cycle. Thus the internal data bus is a wide interface between the input ports and the embedded packet memory.

DETAILED DESCRIPTION

The present invention relates to an improvement in network switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that as ports are added to a network switch, or as network speeds are increased, memory bandwidth requirements are substantially increased. Memory access times have been decreasing at a slower pace than the increase in Ethernet speeds. Thus higher bandwidth must come by increasing the bus width to the memory. However, increasing the memory bus width also increases pincount and I/O to an external memory.

Using an embedded memory eliminates the pincount problem, since the wider memory bus is entirely internal to a semiconductor integrated circuit chip. Memory bandwidth can be increased by increasing the width of the internal bus without increasing a number of external I/O pins on the IC package. In the graphics controller field, the assignee has been able to produce embedded dynamic-random-access memory (DRAM) memories with bus widths of 128 and 256 bits with a clock speed of 100 MHz. A 256-bit-wide internal DRAM produces a bandwidth in excess of 3 Gbytes/sec. This is a sufficiently large bandwidth to achieve a 128-port 100 Mbps network switch or a 12-port 1-Gbps switch.

Furthermore, using a DRAM embedded memory rather than a SRAM memory greatly increases the available memory depth. Large packets can be stored for many ports in the larger DRAM memory. These larger packets are preferred since they minimize network overhead and increase performance.

Additionally, the inventor has realized that the embedded DRAM can be organized so that a largest packet is stored within a single DRAM page. Faster page-mode access cycles can then be used to read or write the packet. The inventor has further realized that the higher bandwidth allows the entire packet to be read or written all at once resulting in sequential access of the DRAM, thus maximizing the use of page hit access cycles. Lower bandwidth memories might have unacceptably high latencies if entire packets were read without interruption.

When packets are aligned to DRAM pages, the inventor has realized that only the DRAM row address where the packet is stored needs to be sent to the receiving port. The column address does not have to be sent, only the packet size (length). This reduces the address size by almost half since only the row addresses are transferred among ports.

Figure 1A:
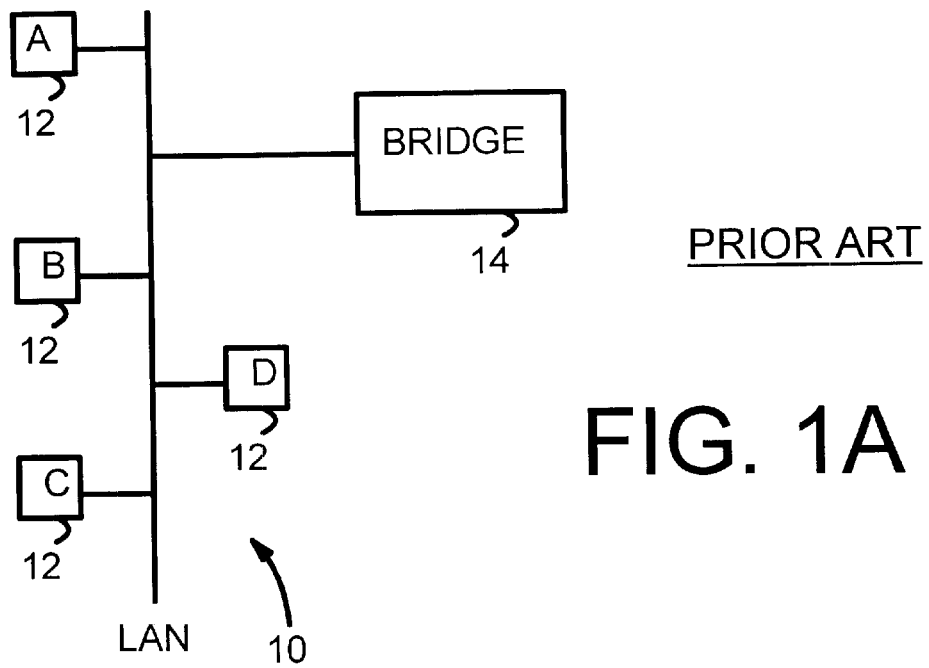
FIG. 1A illustrates a prior-art LAN using a single collision domain.
Figure 1B:
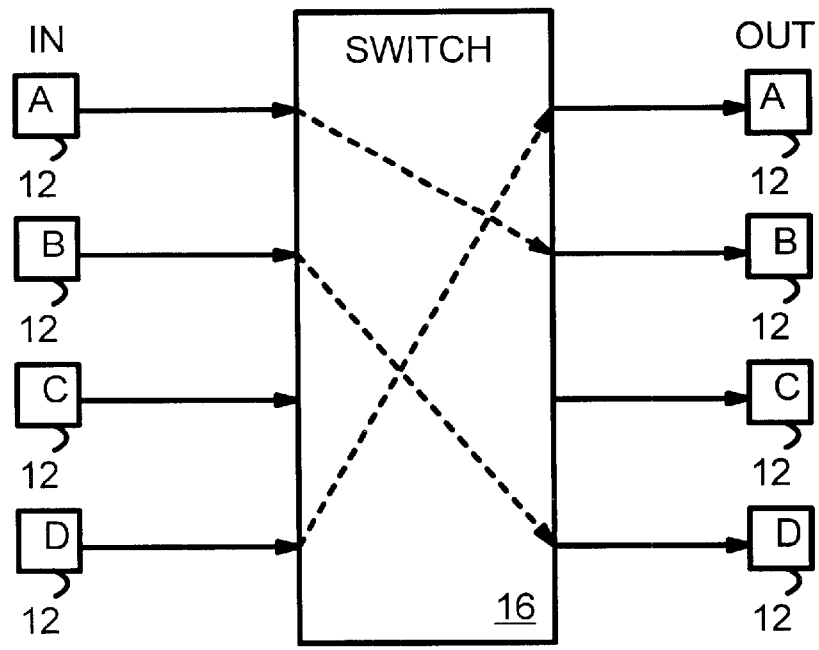
FIG. 1B shows a LAN using a network switch to avoid large collision domains.
Figure 2:
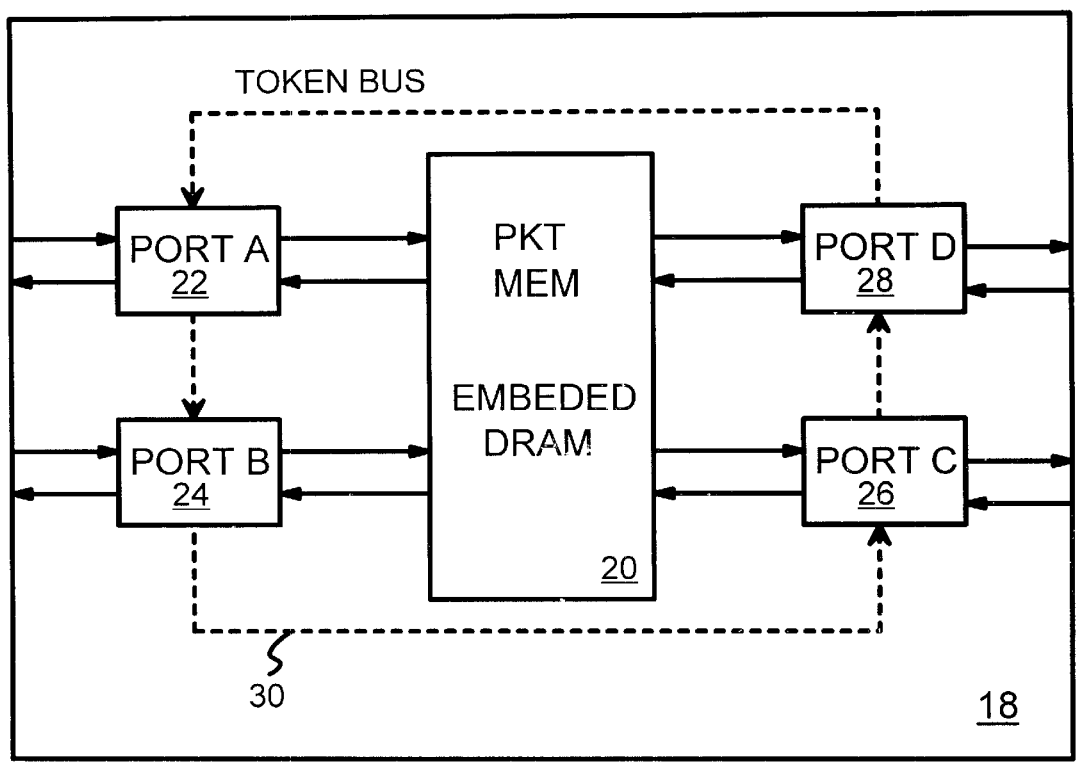
FIG. 2 is a diagram of a store-and-forward network switch with an embedded DRAM and an internal token bus.

Embedded-DRAM Network Switch—FIG. 2

FIG. 2 is a diagram of a store-and-forward network switch with an embedded DRAM and an internal token bus for control. Network switch chip 18 is a store-and-forward switch that receives packets from one of four ports A, B, C, D, stores the packets in embedded DRAM packet memory 20, and transmits the stored packets out to one or more of the four ports A, B, C, D.

Port logic 22, 24, 26, 28 are bi-directional ports to a network node connected to a computer, peripheral, LAN segment, or other network equipment such as another switch, router, repeater, bridge or hub. Packets may be input or output from any port. When a packet is received by port logic 22, 24, 26, 28, it first writes the packet into embedded DRAM packet memory 20. A very wide bus is provided between port logic 22, 24, 26, 28 and packet memory 20. For example, a 256-bit data bus may be used so that 32 bytes are transferred per memory-access cycle. When the memory-access cycle is 10 nanoseconds, the memory bandwidth is 3.2 Gbytes/sec.

Once the packet has been written into packet memory 20, a message is sent from the input port logic to the output port logic. For example, when a packet is received on port A to be sent to port C, port logic 22 writes the packet into packet memory 20 and then sends a message to port logic 26 (port C). Port logic 26 responds by reading the packet from packet memory 20 and transmitting it out of switch chip 18 through port C. An acknowledgement message is then sent back from port C logic 26 to port A logic 22. The acknowledgement message instructs port A to release the space used by the packet in packet memory 20.

The messages are sent among port logic 22, 24, 26, 28 over token bus 30. Token bus 30 is another internal bus in switch chip 18. Token bus 30 is not part of any external network and is simply used to pass internal messages from port to port within switch chip 18.

Figure 3:
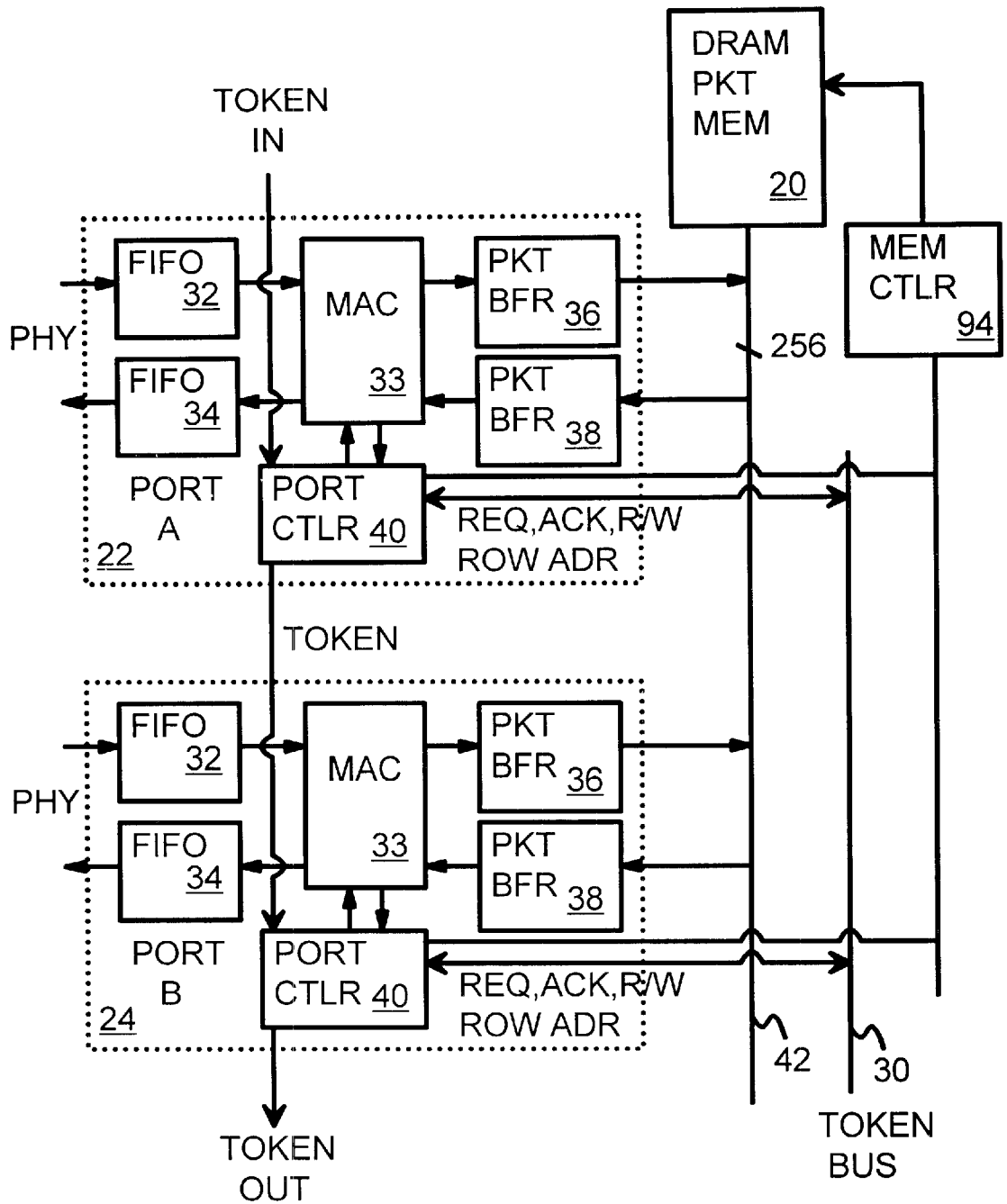
FIG. 3 is a diagram of a switch chip with an internal packet memory showing more detail of port logic that send messages over an internal token bus.

Port Logic Uses Token Bus and Internal DRAM—FIG. 3

FIG. 3 is a diagram of a switch chip with an internal packet memory showing more detail of port logic that send messages over an internal token bus. Port A logic 22 and port B logic 24 are bi-directional, each having a receive first-in-first-out FIFO 32 and a transmit FIFO 34 that connect to a twisted pair through physical-layer transceivers. FIFOs 32, 34 are relatively small, their purpose is to hold data and provide a bus conversion between the external interface such as Media Independent Interface (MII) or RMII and the internal bus.

A data packet received through receive FIFO 32 is parsed by media-access-controller MAC 33 for the destination address. A table lookup may be performed in a routing table to determine which of the other ports in switch chip 18 to send the packet to. The received packets are then sent to receive packet buffer 36 and later written to embedded DRAM packet memory 20.

When port A is the output port, the packet written into packet memory 20 is read by port logic 22 into transmit packet buffer 38. Then MAC 33 adds the low-level source address to the packet and transmits it out through transmit FIFO 34 to the external media. MAC 33 may perform other tasks such as checksum checking and generation and removing and adding low-level media-specific fields to the packet. MAC 33 may provide the packet header information to a packet processor for possible higher-layer processing.

Packet buffers 36, 38 are large enough to contain an entire packet, including the larger 1.5-Kbit packets. This allows for some flow control without data loss when the port cannot immediately write the packet into DRAM packet memory 20, such as when another port is accessing the memory, or when DRAM refresh occurs. The packets are sent to DRAM packet memory over DRAM data bus 42, which is a single data bus with 256 data lines (signals). Packet memory 20 is a low-cost single-port DRAM.

Since all ports must share packet memory 20, arbitration is needed among the ports to limit access to one port at a time. Memory controller 94 receives requests (REQ) for memory access from port controller 40 in each port logic and replies with a grant acknowledgement (ACK) when a port is allowed access. Memory controller 94 generates the memory strobes and timing signals needed to transfer the data from packet buffer 36 over data bus 42 to DRAM packet memory 20 for write (input port), or from DRAM packet memory 20 over data bus 42 to packet buffer 38 on a read (output port).

When a packet is received by port logic 22, a message is sent to the output port's port controller 40. This message is sent over token bus 30. All other ports read the message on token bus 30 but discard it unless the message's destination port matches.

Since token bus 30 is shared among all port controllers 40, collisions could occur as packets are received at random intervals. To avoid collisions on token bus 30, a token-passing scheme is used. All port controllers 40 are connected together in a ring or loop. Only one token is present at any time. This token is passed from port controller 40 to the next port controller 40 in the ring. A port may send a message over token bus 30 only when the port has the token. Thus only one port controller 40 may send a message over token bus 30 at any time.

When an input port has received a packet and written it to packet memory 20, it must wait for the token to be passed around the ring to that port. Once the token is received, the port sends a message to the output port. This message includes the port number (A, B, C, D) of the output port and the row address within DRAM packet memory 20 where the packet is stored.

The output port listens to all messages sent over token bus 30. When a message matching its port number is detected, the row address from that message is stored by the output port's port controller 40. The output port requests access to packet memory 20. When memory controller 94 grants the output port access to packet memory 20, the row address from the message is sent to memory controller 94 and the packet data is read from packet memory 20 into transmit packet buffer 38 of the output port. The packet is then passed through MAC 33 and transmit FIFO 34 to the output media.

Once the token returns to the output port, the output port sends an acknowledgement message over token bus 30 to the input port. This acknowledgement message instructs the input port to release the memory space used by the packet that was just transmitted.

A centralized packet processor may also be present. The packet processor performs network management functions and policy decisions. A search engine for searching a network routing table can also be controlled by the packet processor. The packet processor can have a user interface to allow for policy and routing table changes.

Figure 4:
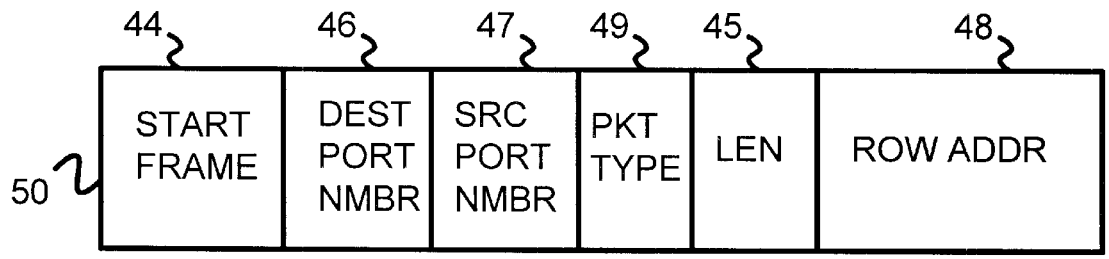
FIG. 4 shows the format of a message sent over the token bus.

Token-Bus Message—FIG. 4

FIG. 4 shows the format of a message sent over the token bus. Message 50 begins with a fixed sequence of bits in start frame 44, such as 7 one bits (7E Hex) for synchronization. The destination (output) port number (A, B, C, D) is contained in destination field 46 while the source (input) port-number is in field 47. These are simple identifiers that indicates which of the switch chip's ports is the source or destination. The IP or MAC address is not included in the message.

Packet type field 49 indicates if the packet is a normal (uni-cast) packet, multicast, or a broadcast packet sent to all ports. When the message is an acknowledgement message from the destination port back to the source port, packet type field 49 is set to 00. The row address of the packet in the DRAM packet memory is contained in row-address field 48. Only the row address portion of the packet is sent in the message; the column address is assumed to begin at 0, since each packet is aligned to the DRAM row boundary. Sending just the row address and not the column address reduces the size of the message, improving token-bus performance.

Length field 45 contains the packet length that is obtained from the packet header. Other fields can be included for policy information, such as an indication of the priority of the packet or the type of application that generated the packet.

Figure 5:
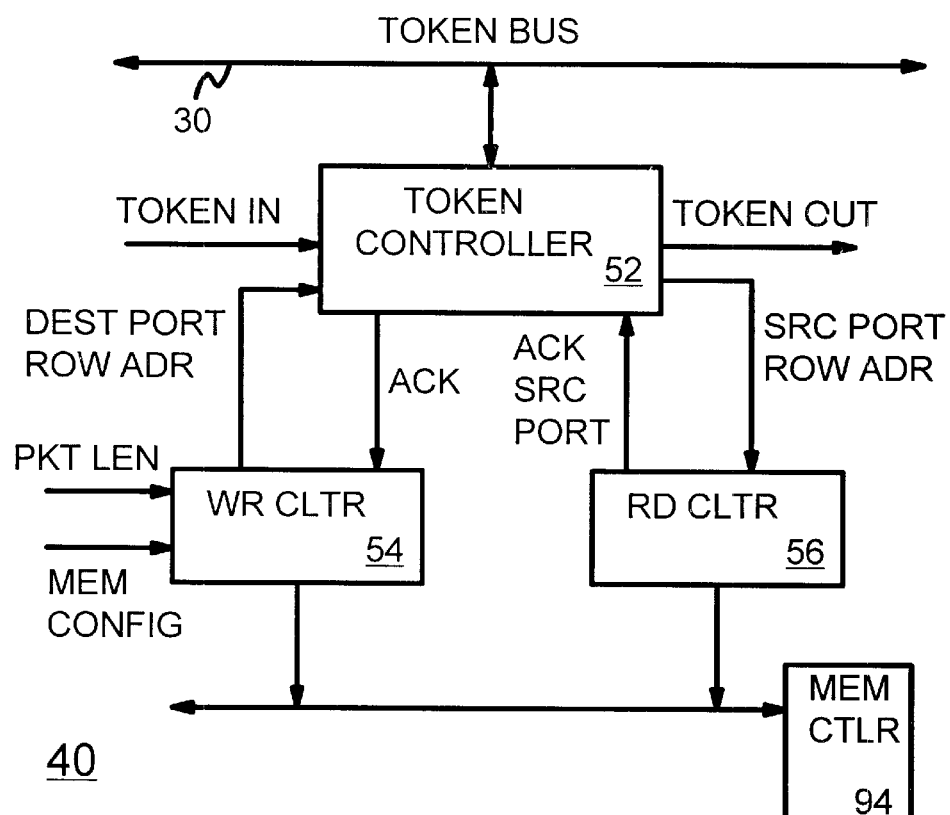
FIG. 5 shows in more detail a port controller that sends and receives messages over the token bus.

Detail of Port Controller—FIG. 5

FIG. 5 shows in more detail a port controller that sends and receives messages over the token bus. Port controller 40 includes token controller 52 that communicates with token bus 30, and write controller 54 and read controller 56 that control access to the embedded DRAM packet memory.

When a new packet is received by the input port from the external media, write controller 54 sends a request to memory controller 94, and when granted access to the packet memory, writes the packet to the packet memory. Write controller 54 sends a row address and increments a column address from zero to the packet length as the packet data is written to the DRAM packet memory. This way the packet is written to the embedded packet memory from the input port.

Write controller 54 assigns one of the rows in the embedded packet memory to the new packet. A busy bit is set for an entry in the port's memory allocation table. The row address from this entry is the row address sent to memory controller 94 while the column address is incremented from zero to the packet length.

Once the packet has been written to the DRAM packet memory, write controller 54 sends the row address, packet length, and the destination port number to token controller 52. When the token circulates back to the current port, token controller 52 keeps the token and sends a message over token bus 30 to the destination port. The message has the destination port number, packet length, and the row address from write controller 54. Once the message has been sent by token controller 52, the token is released to the next port controller in the token loop, allowing the next port controller to send a message over token bus 30.

Token controller 52 listens to all messages sent over token bus 30. When the destination port field in a message matches the port number of the port controller, then the message is accepted. Other message are ignored, except for broadcast messages that are identified by a special broadcast message type.

When the message received is a normal message sent from the input port, the current port is the output port. Token controller 52 sends the row address from the message to read controller 56. Read controller 56 then sends a request to memory controller 94, and when granted access to the packet memory, sends the row address and increments the column address from zero to the packet length. This way the packet is read from the embedded packet memory to the output port. The packet may then be transmitted to the external media.

When the message received over token bus 30 is an acknowledgement message sent from the output port, the current port is the input port. The acknowledgement message tells the input port that its packet has been read from the packet memory and the memory space can now be re-used (de-allocated). Token controller 52 sends the row address from the message to write controller 54. Write controller 54 then clears the busy bit in the corresponding entry in its memory allocation table.

Figure 6:
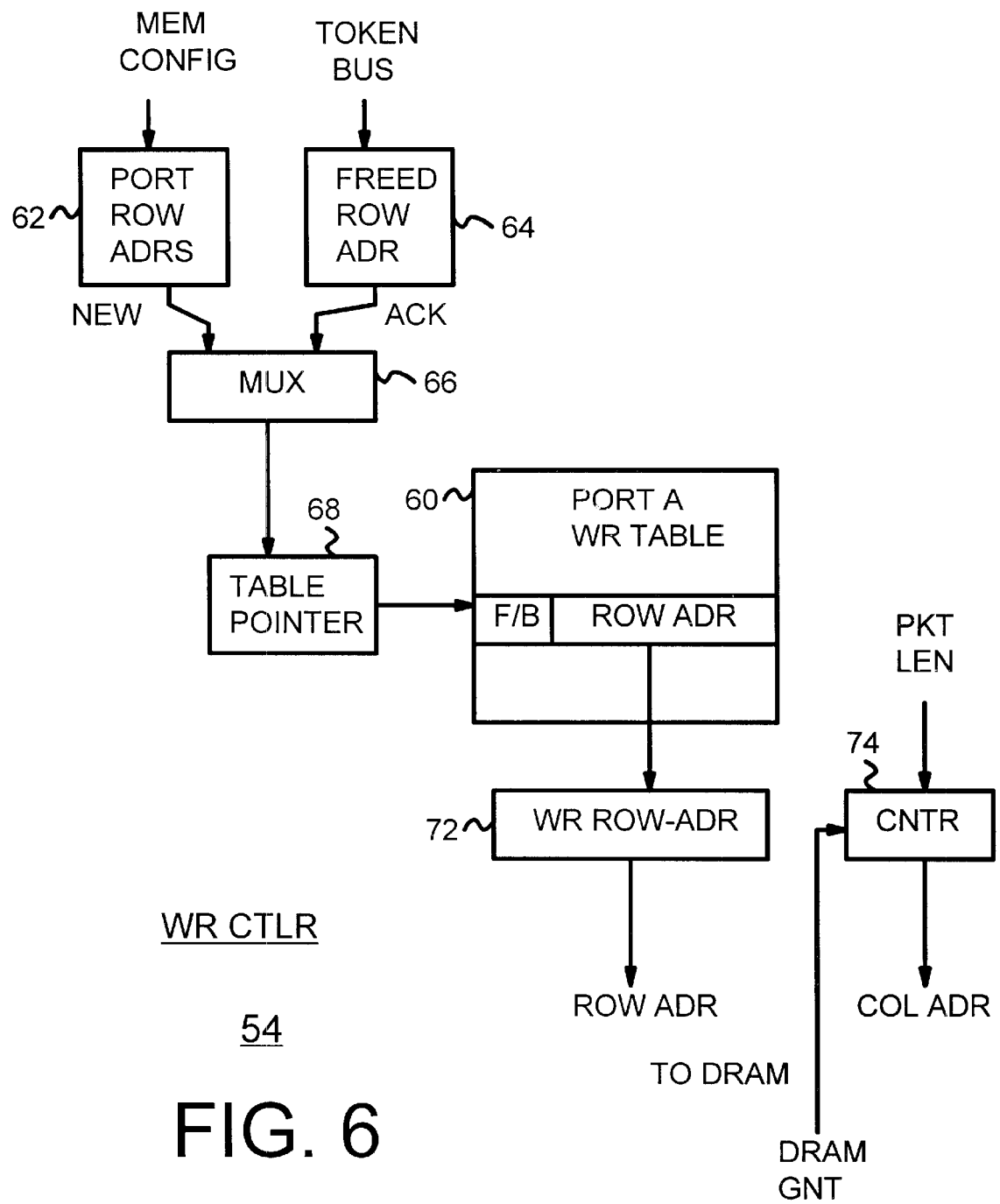
FIG. 6 is a diagram of the write controller for an input port that writes the packet to the embedded DRAM packet memory.

Write Controller—FIG. 6

FIG. 6 is a diagram of the write controller for an input port that writes the packet to the embedded DRAM packet memory. The embedded DRAM packet memory is divided into buffer regions, one for each input port. Each port's buffer region is further divided into DRAM rows, with each row for storing one packet.

Input-port table 60 is a memory-allocation table with one entry for each row of the packet memory allocated to the port. Each entry contains the row address and a free/busy bit. When a new packet is written to the packet memory, the row address is taken from an entry in table 60 that has its free/busy bit cleared (free). The free/busy bit is then set to busy as the packet is written in to the packet memory. When number of packet entries reaches a programmable threshold, a flow-control-off message is sent to the sending device.

When the acknowledgement message is received from the output port, the packet has been read from the packet memory and no longer has to be stored. The freed row address from the acknowledgement message received from the token bus is latched into free row address register 64, and then loaded in the table pointer with an offset that points to its location in the table. The free-busy bit is cleared to free for the matching entry. The row address can then be used for another new packet received from the external media.

During system initialization, the packet memory is divided into regions for each input port. The row addresses for all rows in a port's region are sent as the memory configuration and latched into register 62. Then mux 66 writes each configured row address to an entry in table 60. Table pointer 68 is used to point to one of the entries for access.

When a new packet is received by the input port from the external media, it must be written into the embedded DRAM packet memory. A free row address is found in table 60, and its free/busy bit changed to busy. The row address from that entry is loaded into row-address register 72. The length of the packet is determined by reading a packet-length field in the incoming packet. This packet length is loaded into counter 74 as the terminal count.

Write controller 54 then makes a request to the memory controller for access to the packet memory. When the memory controller grants access to write controller 54, the row address from row-address register 72 is sent to the memory controller along with a read/write (R/W) signal set to write. The column address is output from counter 74.

Since a wide interface is provided to the embedded DRAM packet memory, many bytes are written during each memory-access cycle. Still, several memory cycles may be needed, especially for the larger packets. Counter 74 is incremented for each memory cycle until all the packet has been written, and counter 74 reaches the length of the packet.

The actual packet length in bytes may be loaded into counter 74, and only the upper bits of counter 74 sent as the column address. Counter 74 is incremented by the data-bus width for each memory cycle. In another embodiment, the packet length is divided is by the DRAM data-bus width before being loaded into counter 74. Counter 74 then increments by one for each memory access cycle until counter 74 reaches the packet length modulo the data-bus width.

For example, a 256-bit data bus writes 32 bytes for each memory cycle. For a packet length of 1.5 Kbyte, 48 memory cycles are required to write the entire packet. The column address from counter 74 indicates which column of 32 bytes is to be written in the current row from row-address register 72.

Figure 7:
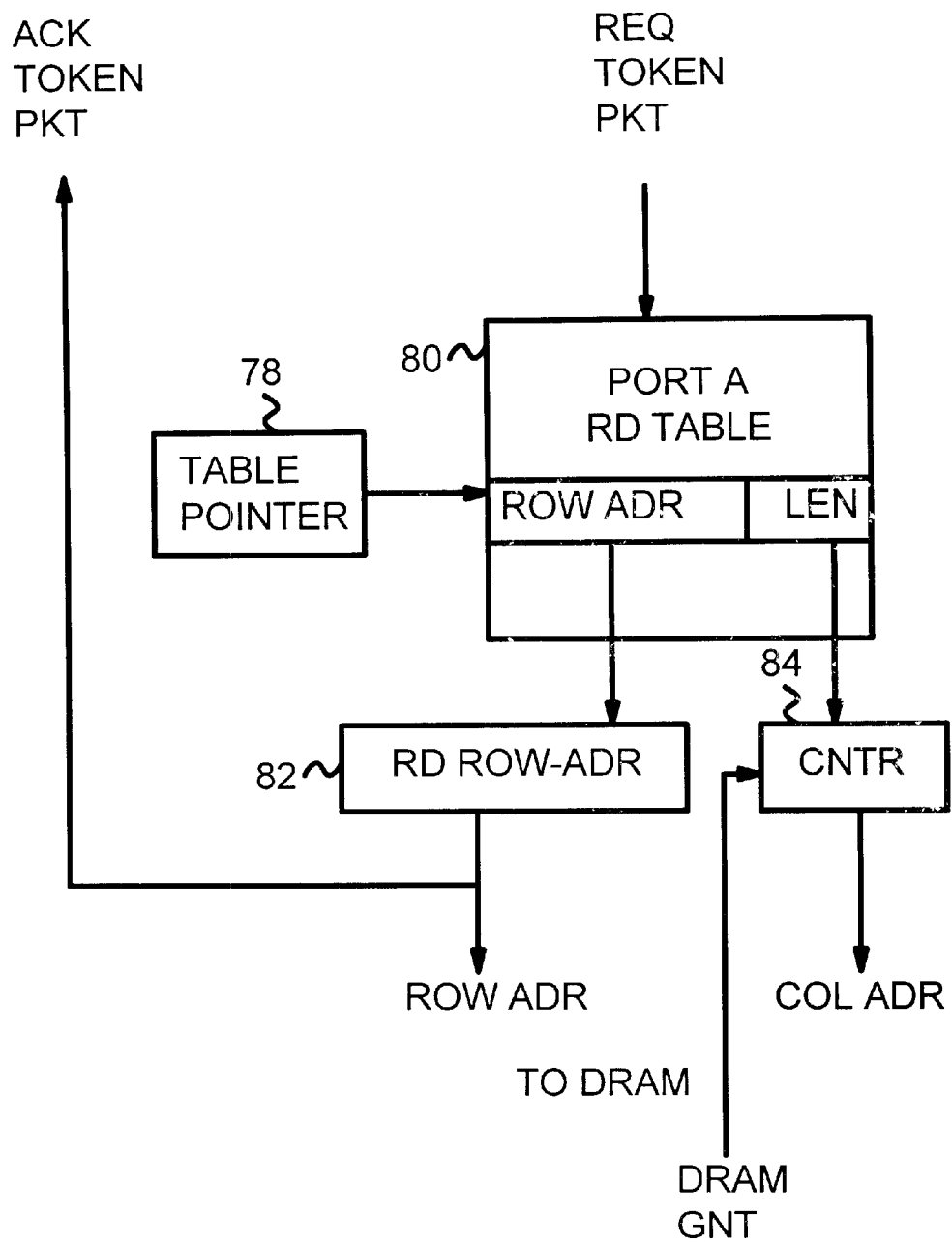
FIG. 7 is a diagram of the read controller for an output port that reads the packet from the embedded DRAM packet memory.

Read Controller—FIG. 7

FIG. 7 is a diagram of the read controller for an output port that reads the packet from the embedded DRAM packet memory. Read controller 56 receives a message from the token bus that a packet is being sent from an input port. The row address from this message is stored in table 80, along with the length of the packet. Table 80 acts as a simple FIFO or queue, allowing multiple input ports to send packets to the same output port, which processes the packets one at a time.

Pointer 78 contains a write pointer and a read pointer. The write pointer points to an unused entry that should receive the next message's row address. The read pointer points to the next entry to be processed. The row address from this entry is loaded from table 80 to row-address register 82, while the packet length is loaded into counter 84. This packet length is loaded into counter 84 as the terminal count.

Read controller 56 then makes a request to the memory controller for access to the packet memory. When the memory controller grants access to read controller 56, the row address from row-address register 82 is sent to the memory controller along with the read/write (R/W) signal set to read. The column address is output from counter 84.

With a wide interface to the embedded DRAM packet memory, many bytes are read during each memory-access cycle. Several memory cycles may still be needed, especially for the larger packets. Counter 84 is incremented for each memory cycle until all the packet has been read, and counter 84 reaches the length of the packet.

Once the packet has been read, it can be transmitted from the switch chip to the external media for the output port if it has not been flow-controlled off by the receiving device. The row address from row-address register 82 is then sent to the token controller. A message is formatted and sent to the input port with this row address, telling the input port that the packet has been sent and allowing the input port to release the row address in the packet memory.

Figure 8:
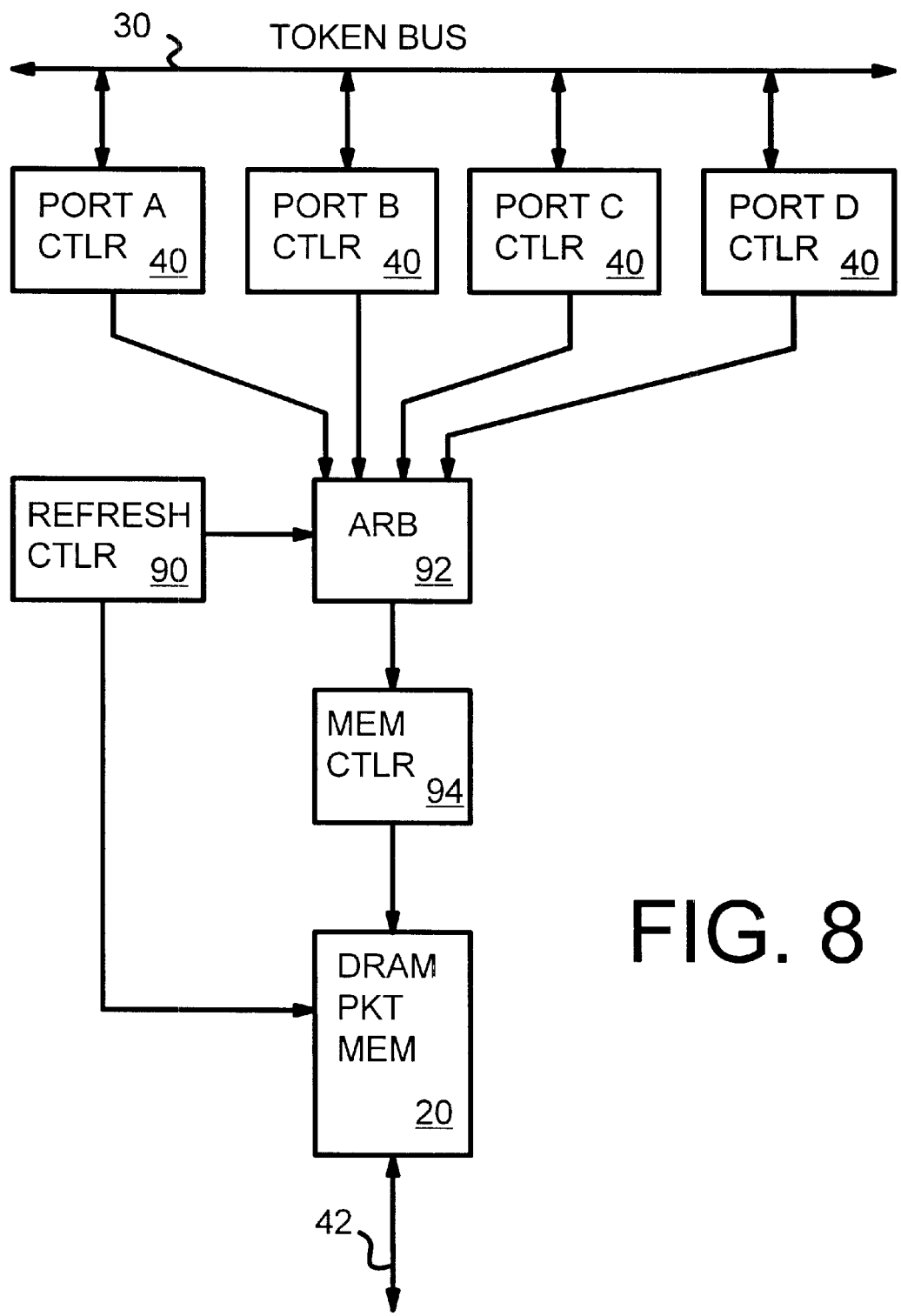
FIG. 8 is a diagram of arbitration of port controllers accessing the embedded DRAM packet memory.

Memory Arbitration—FIG. 8

FIG. 8 is a diagram of arbitration of port controllers accessing the embedded DRAM packet memory. Port controller 40 send messages to each other over token bus 30. These messages include row addresses in packet memory 20 where packets are stored. When a port controller needs to write a packet into memory 20, or read a packet out of memory 20, it must arbitrate for access to packet memory 20 since this memory is shared among all ports.

Port controllers 40 send requests to arbiter 92 when memory access is needed. Refresh controller 90 also must have periodic access to packet memory 20 to perform refresh operations so that data is not lost. Arbiter 92 receives all requests and grants access to one port controller 40 at a time. When refresh controller 90 is granted access, no port controller may access memory 20. Arbiter 92 uses a round-robin arbitration scheme.

Network policy can be implemented to prioritize important packets such as for voice or videoconferencing applications. These high-priority packets can have their port controller 40 signal arbiter 92, which then grants the port immediate or higher-priority access.

Arbiter 92 informs memory controller 94 of which port controller 40 has won arbitration. Memory controller 94 then generates timing signals to embedded DRAM packet memory 20 for each memory cycle until the port controller indicates that it has finished. Port controllers are not pre-empted. Instead, each port controller continues to access packet memory 20 until the entire packet has been read or written. Since the packet is located within a single row of the DRAM, most of these access cycles are the more efficient page-mode row-hit cycles, increasing performance.

Several bytes are sent to or received from the packet buffers in a port's logic for each memory cycle. For a 256-bit DRAM data bus 42, 32 bytes are read or written for each memory cycle. A maximum of 48 cycles are needed for the largest packet, 1.5 Kbytes. Since each memory cycle is 10 nanoseconds, 480 nanoseconds are needed, plus about 6 cycles for the first access cycle for row precharge. Thus no more than about half a microsecond are needed for each port. The maximum latency for a switch with 8 ports all active at the same time is about 4 microseconds.

Figure 9:
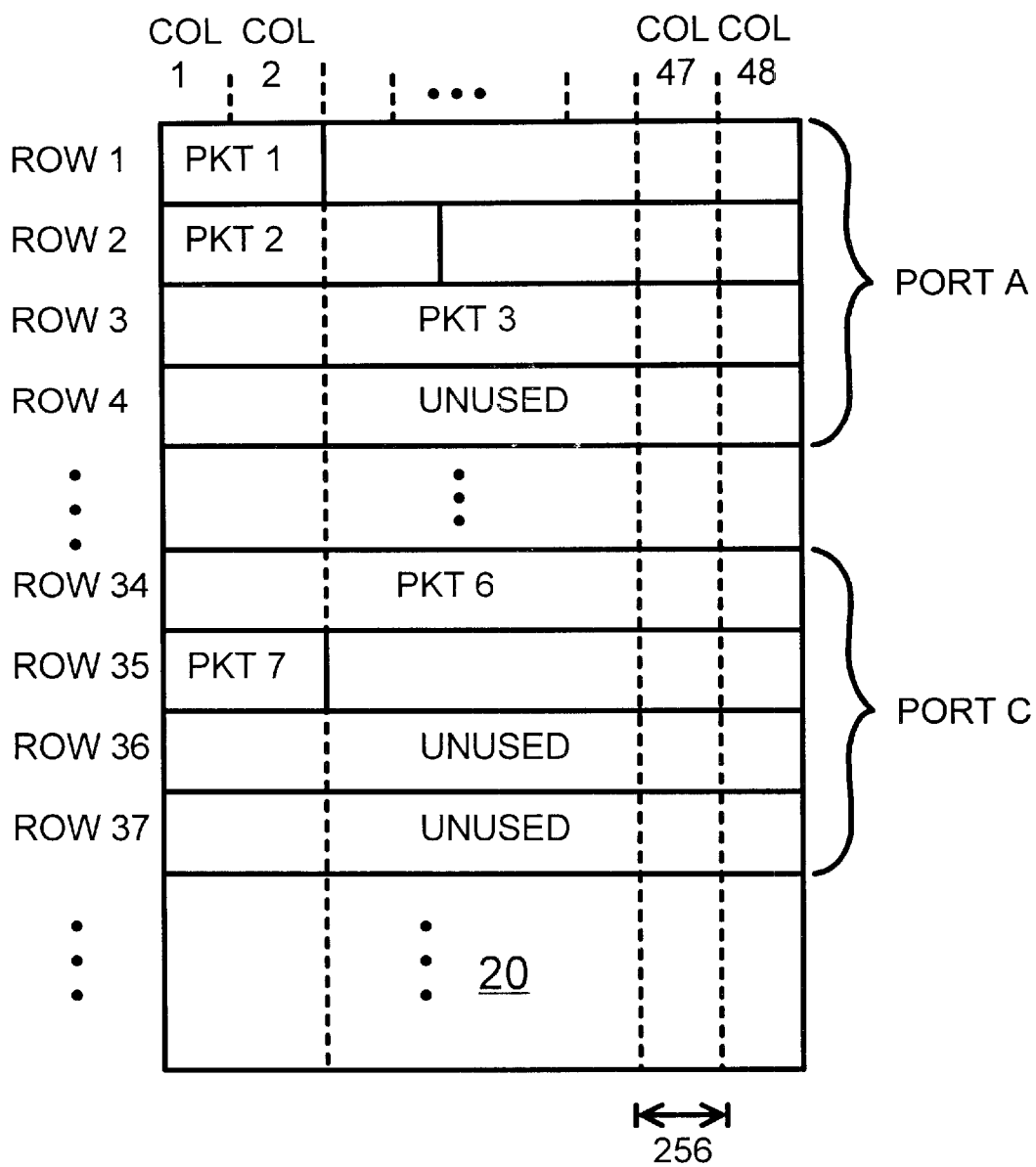
FIG. 9 shows that packets are stored at DRAM-row boundaries in the embedded packet memory.

Packets Stored on DRAM-Row Boundaries—FIG. 9

FIG. 9 shows that packets are stored at DRAM-row boundaries in the embedded packet memory. The DRAM memory cells in packet memory 20 are arranged into an array of rows and columns. The row address is sent to the DRAM first, followed by the column address, which is the address within a row.

A row of cells is known as a DRAM page, and accesses to other cells in the same row are faster than accesses to other rows. Accesses within the same row are known as page-mode hit cycles, while accesses to other DRAM rows are known as row miss cycles or precharge cycles. A longer access time is needed when changing to a different row since a period of time known as a row precharge is needed before the cells can be read.

Each column in the DRAM array is the width of the data bus, 256 bits or 32 bytes. Each page-hit memory-access cycle reads one column, or 32 bytes. The memory array has a total of 48 columns, which makes each row contains 32×48 bytes, or 1.5 Kbytes. Since 1.5 Kbytes is the size of the largest packet, an entire packet can fit within a single row. Each row can contain a different packet.

When a packet is read or written, the first memory cycle is a page-miss cycle requiring 6 clock cycles, while all the other cycles are page hit cycles requiring one clock each. This arrangement of the packets in DRAM rows is very efficient since mostly DRAM page hit cycles are used.

In the example of FIG. 9, the packet memory is divided into several regions, one for each input port. Output ports are not assigned any memory space. The region for port A includes rows 1, 2, 3, 4, while the region for port C contains rows 34, 35, 36, 37. Thus ports A and C can buffer up to 4 packets each, since each has 4 rows allocated in the embedded packet memory.

Packet 1 received by port A is written into row 1. Since this is a small packet of 64 bytes, it occupies only the first two columns. The other 46 columns in row 1 are not used. The next packet received by port A is packet 2, which is stored in row 2. Packet 2 is somewhat larger, occupying the first 4 columns (128 bytes). Packet 3 is a 1.5-Kbyte packet and occupies the entire row 3, all 48 columns. Row 4 is unused but will receive the next packet input to port A.

Port C has received two packets. Packet 6 is another large 1.5-Kbyte packet, and occupies all 48 columns of row 34. Packet 7 is a small 64-byte packet and occupies just the first 2 columns. Columns 3–48 of row 35 are unused. Some rows of packet memory 20 can be reserved for management functions.

Figure 10:
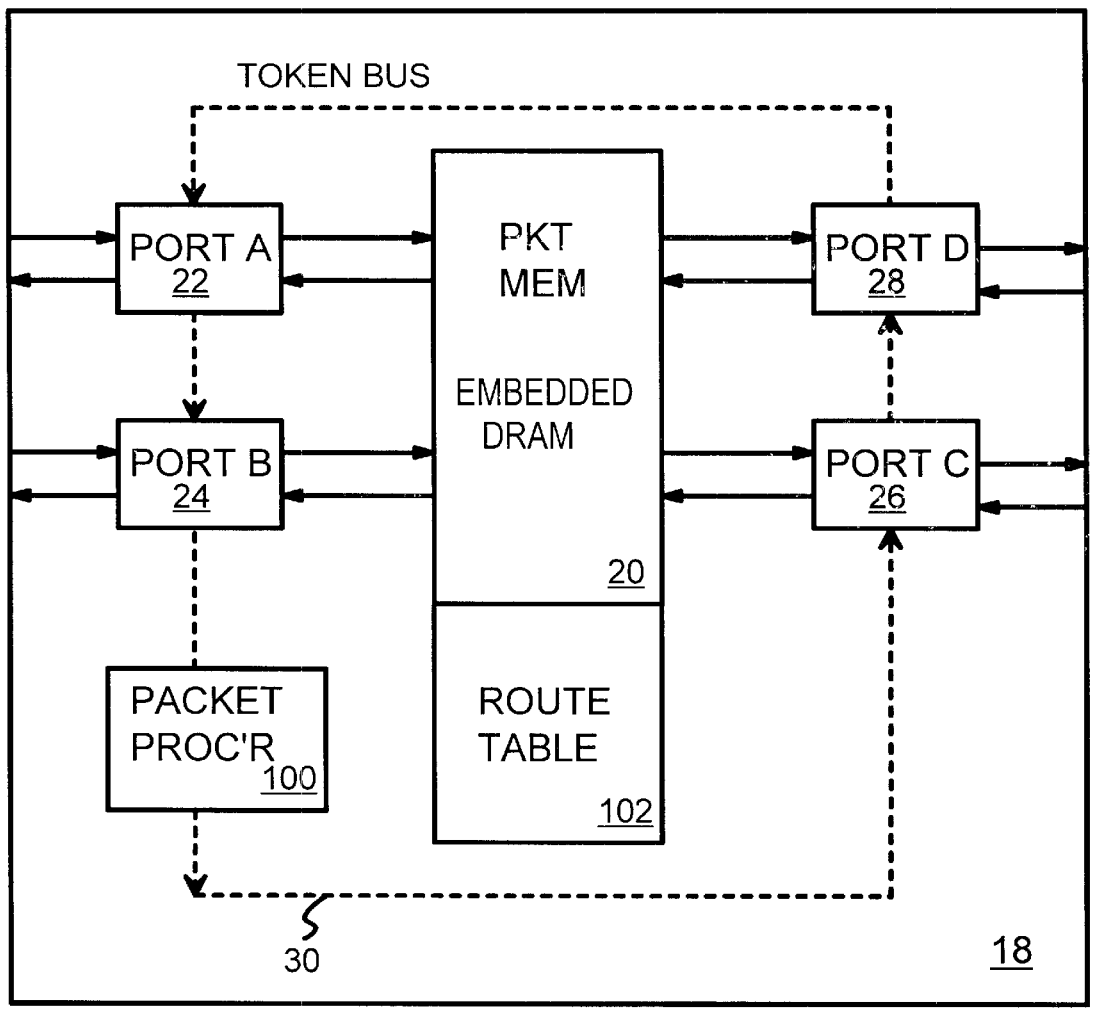
FIG. 10 shows a switch chip with an embedded DRAM storing a packet memory and a routing table.

Packet Processor and Packet Memory—FIG. 10

FIG. 10 shows a switch chip with an embedded DRAM storing a packet memory and a packet processor that includes a routing table for multi-layer processing. Network switch chip 18 is a store-and-forward switch that receives packets from one of four ports A, B, C, D, stores the packets in embedded DRAM packet memory 20, and transmits the stored packets out another of the four ports A, B, C, D.

Packet processor 100 is also coupled to token bus 30. Packet processor 100 receives IP, MAC or other header parameters (addresses) from port controller for packets that have been received. A special message can be used to send processing requests to packet processor 100, and for packet processor 100 to send the results back to the port controller.

Packet processor 100 compares the IP or MAC address to IP or MAC addresses stored in entries in routing table 102 and performs policy (filter) processing. When instructions are sent through the token bus to the output port controller whether the packet should be sent through that port to reach its final destination.

Routing table 102 in packet processor 100 contains entries for network policy or filters with IP or MAC addresses and the port number on switch chip 18 that is the next hop to that IP or MAC address.

When a packet is received by port logic 22, 24, 26, 28, it first writes the packet into embedded DRAM packet memory 20. Once the packet has been written into packet memory 20, a message is sent from the input port logic to the output port logic via packet processor with appropriate policy application instructions. Port logic 26 responds by reading the packet from packet memory 20 and transmitting it out of switch chip 18 through port C. An acknowledgement message is then sent back from port C logic 26 to port A logic 22. The messages are sent among port logic 22, 24, 26, 28 over token bus 30. Token bus 30 is another internal bus in switch chip 18.

Further details of the search engine of packet processor 100 and routing table 102 can be found in the co-pending application "Circulating Parallel-Search Engine with Random Inputs for Network Routing Table Stored in a Wide Embedded DRAM", U.S. Ser. No. 09/240,726, filed Jan. 29, 1999.

ADVANTAGES OF THE INVENTION

A network switch with shared embedded DRAM is ideally suited for higher network speeds such as 100 Mbps, 1 Gbps and beyond. Ports can be added without significantly increasing the cost of the switch. The network switch can support a large number of high-speed ports. Increasingly larger numbers of pins for external memory access on a network-switch chip are avoided as higher network speeds are used and higher memory bandwidth is required. A high memory-bandwidth network switch uses a store-and-forward memory with sufficient memory bandwidth for 1 Gbps networks.

Memory access times have been decreasing at a slower pace than the increase in Ethernet speeds. Higher bandwidth is achieved with the embedded packet memory by increasing the bus width to the memory.

Using the embedded memory eliminates the pincount problem, since the wider memory bus is entirely internal to a semiconductor integrated circuit chip. Memory bandwidth can be increased by increasing the width of the internal bus without increasing a number of external I/O pins on the IC package. A 256-bit-wide internal DRAM produces a bandwidth in excess of 3 Gbytes/sec. This is a sufficiently large bandwidth to achieve a 128-port 100 Mbps network switch or a 12-port 1-Gbps switch.

Using a DRAM embedded memory rather than an external SRAM memory greatly increases the available memory depth. Large packets can be stored for many ports in the larger DRAM memory. These larger packets are preferred since they minimize network overhead and increase performance.

The embedded DRAM is organized so that a 64-byte or 1.5K packet is stored within a single DRAM page. Faster page-mode access cycles are used to read or write the packet. The higher bandwidth allows the entire packet to be read or written all at once, maximizing the use of page hit access cycles.

Since the packets are aligned to DRAM pages, only the DRAM row address where the packet is stored needs to be sent to the receiving port. The column address does not have to be sent, only the packet size (length). This reduces the address size by almost half since only the row addresses are transferred among ports. Sending just the row address and not the column address reduces the size of the message, improving token-bus performance.

The invention's architecture allows for scalability of the design such that number of ports, memory size, and the bus width can be scaled and optimized for the application.

The architecture also allows a design of a simple Layer-2-only switch or a more complex multi-layered (layers 3–7) switch. Embedding the packet memory with control logic reduces power dissipation of the overall system. Integrating packet memory and the packet processor on the same chip makes network-policy applications at wire speed possible, thus increasing system throughput.

ALTERNATE EMBODIMENTS

Several other embodiments are contemplated by the inventor. For example the invention can be used for store-and-forward cell Switching, where each cell can be stored in the embedded DRAM page. Dynamic registers or latches may be used for entry registers. FIFO buffers or pipeline latches can be inserted into the circuitry at many points, such as to and from the embedded memory. Multiple tables or banks of embedded DRAM with different contents can be used to perform searches as well as store packets. The embedded DRAM may be integrated on a same silicon substrate with the parallel search engines. Other kinds of substrates may be substituted.

Port controllers can be designed for varying data rates such as 10 Mbit, 100 Mbit, 1 Gbit or higher. A high-speed port such as a 1-Gbit port may be used for an uplink for port aggregation and/or for cascading these chips to achieve higher port count. A 2.4 Gbit (OC 48) port may also be providing for connection to a wide-area network (WAN). The input port numbers can be assigned in such a way that they form the MSB's of the absolute row address. This reduces the number of bits required for the row address transferred across the token bus.

Test mode hardware may be added to connect the internal data bus to external I/O pins for testing the embedded packet memory. The data bus may be compressed using a signature generator or analyzer or other test logic before being sent off-chip. However, during normal operation the internal data bus is not connected to the external I/O pins. Thus any test-mode connection of the internal data bus to external pins is not considered a true connection to external pins since the normal function of the external pins must be halted to pass the test data.

The DRAM row size can be varied from 8 columns to 64 to fit the requirement of the application. Many logic and firmware implementations are possible for the controllers. Other kinds of networks besides Ethernet can benefit from the invention. Different numbers of ports can be used with the switch chip, and some ports can be unidirectional. The switch chip can be used for LANs or in higher-speed backbone networks. The format of the messages can be changes and fields added for network management and policy control. The message or token bus can also use other control schemes besides token passing. Daisy chaining or a centralized arbiter can be used to control access to the token bus. The token bus may be further sub-divided as well.

The foregoing description of the embodiments of the invention has been presented for is the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A network switch chip comprising:

a plurality of input ports connected to external network nodes to receive packets;

a plurality of output ports connected to external network nodes, the output ports for transmitting the packets to the external network nodes;

an embedded packet memory for temporarily storing packets received from the input ports for transfer to the output ports for transmission, the embedded packet memory being a dynamic-random-access memory (DRAM) organized into rows and columns;

an internal data bus, coupled to the embedded packet memory, for writing packets from the input ports to the embedded packet memory, and for reading the packets from the embedded packet memory to the output ports, the internal data bus being an internal bus without connection to external pins of the network switch chip during normal operating modes when packets are transmitted from input ports to output ports;

port controllers, coupled to the input ports and the output ports, for detecting packets received at an input port and writing the packet into the embedded packet memory over the internal data bus, and for reading the packet from the embedded packet memory to an output port; and a message bus, coupled to the port controllers, for sending a message from a port controller for an input port that receives a packet to a port controller for an output port that is a destination indicated by the packet, the message causing the port controller for the output port to read the packet from the embedded packet memory, whereby packets are switched from an input port to an output port by being written to and read from the embedded packet memory using the internal data bus in response to the message sent over the message bus.

2. The network switch chip of claim 1 wherein the message bus is further for sending an acknowledgement message from the port controller for the output port to the port controller for the input port when a packet has been read from the embedded packet memory, the port controller for the input port releasing a memory space occupied by the packet in response to the acknowledgement message, whereby memory space in the embedded packet memory is released when the acknowledgement message is sent over the message bus.

3. The network switch chip of claim 1 wherein the port controller for the input port writes an entire packet to a row of the embedded packet memory without interruption by other port controllers, wherein page-mode accesses to a same row in the embedded packet memory are faster than page-miss accesses to a different row in the embedded packet memory, whereby the packet is written to the row in the embedded packet memory using mostly faster page-mode accesses.

4. The network switch chip of claim 3 wherein the internal data bus is a wide bus having at least 256 data bits, the internal data bus for transferring at least 32 bytes of data for each memory-access cycle, whereby the internal data bus is a wide interface between the input ports and the embedded packet memory.

5. The network switch chip of claim 4 wherein the internal data bus has a bandwidth of at least 3 Gbytes/second, and wherein the input ports connect to external network nodes operating at 100 Mbps or 1 Gbps, whereby a high bandwidth of the internal data bus allows switching of high-speed network nodes.

6. The network switch chip of claim 5 wherein the internal data bus reads an entire column of a selected row in a single memory-access cycle.

7. The network switch chip of claim 3 wherein each packet is aligned to a beginning of a row in the embedded packet memory when being written into the embedded packet memory by the port controller, whereby packets are row aligned in the embedded packet memory.

8. The network switch chip of claim 7 wherein only one packet is stored in a row of the embedded packet memory;

wherein packets that have a length less that a size of the row are allocated an entire row, whereby each row stores only one packet.

9. The network switch chip of claim 7 wherein the message includes a row address where the port controller for the input port wrote the packet in the embedded packet memory, the row address being a partial address that identifies the row but not a location within the row, wherein column addresses of locations within a row are not sent over the message bus, whereby only row addresses and not column addresses are sent over the message bus to identify the location of the packet in the embedded packet memory.

10. The network switch chip of claim 9 wherein each row of the embedded packet memory has a size sufficient to store a large packet of 1.5 Kbytes.

11. The network switch chip of claim 3 further comprising:

a routing table, in the embedded packet memory, for storing routing entries, each routing entry containing a MAC or IP network address and a port identifier that identifies an output port in the plurality of output ports; and a packet processor, coupled to the routing table, receiving a MAC or IP network address extracted from a header of a packet received by an input port, for finding a matching routing entry in the routing table that has a MAC or IP network address that matches the network address extracted from a header of the packet, the packet processor returning the port identifier from the routing entry that has the matching routing entry, whereby network addresses are searched in the routing table.

12. A store-and-forward integrated-circuit switch comprising:

a packet memory having a plurality of regions, each region for storing packets received from an input port, each region having a plurality of rows, each row for storing a packet, the packet memory being addressed by a row address that identifies one row, and a column address identifying a column within the row;

wherein accesses to columns within a same row require less time than accesses to columns in different rows of the packet memory;

a plurality of external ports for connecting to external network nodes, each bi-directional external port having an input and an output;

port logic for each of the external ports, the port logic including:

an input FIFO for receiving part of a packet transmitted serially to the input;

an output FIFO for storing part of a packet for serial transmission to the output;

a media-access-controller MAC, coupled to the input FIFO and the output FIFO, for extracting a destination address from a packet received by the input FIFO and a packet length from a length field in a header of the packet received;

a port controller, coupled to the MAC, for writing the packet into the packet memory, and for generating a message to a destination port controller, the message including a row address indicating which row in the packet memory the packet was written to, the destination port controller for reading the packet from the packet memory at the row address from the message;

a memory controller, coupled to the packet memory, for receiving memory-access requests from the port controller for each port, for generating a grant to one of the port controllers while delaying access to other port controllers; and a token bus, coupled to the port controllers, for transferring messages generated by one port controller to the destination port controller for the destination address, whereby row addresses for the packet memory are sent in messages over the token bus to instruct the destination port controller to read the packet.

13. The store-and-forward integrated-circuit switch of claim 12 wherein the port logic further includes:

a packet buffer, coupled to the MAC, for assembling an entire packet before writing to the packet memory, whereby an entire packet is written to the packet memory.

14. The store-and-forward integrated-circuit switch of claim 12 wherein the message also includes the packet length, wherein the port controller further includes a counter for generating a column address to the packet memory, the counter generating a different column address for each memory-access cycle until the packet length is reached, whereby column addresses are generated by the counter limited by the packet length.

15. The store-and-forward integrated-circuit switch of claim 14 wherein the port controller further comprises:

a memory-allocation table having entries each containing a row address within the region assigned to the port and a busy bit, the busy bit being set when a packet is written to the packet memory at the row address, the busy bit being cleared when the packet is read by the destination port controller;

wherein the memory-allocation table outputs the row address to the packet memory and to the port controller for inclusion in the message to the destination port controller.

16. The store-and-forward integrated-circuit switch of claim 15 wherein the port controller sends the message when a token is received from an upstream port controller in a loop, the port controller passing the token to a downstream port controller in the loop once the message has been sent over the token bus, whereby the token allows the port controller to send the message over the token bus.

17. The store-and-forward integrated-circuit switch of claim 15 further comprising:

a refresh controller, coupled to the packet memory, for performing refresh cycles on rows in the packet memory to renew charge in dynamic memory cells in the row to prevent data loss, the refresh controller requesting access from the memory controller, wherein other port controllers wait for access of the packet memory when the refresh controller is refreshing the rows, whereby the packet memory is refreshed.

18. A switch for connecting network ports comprising:

embedded memory means for storing packets received from an input port for transmission by an output port;

a plurality of ports, each port having logic that includes:
input port means for receiving packets from an external input;
output port means for transmitting packets to an external node;
write-controller means, coupled to the embedded memory means, for writing a packet received by the input port means to a row in the embedded memory means;
token-controller means, coupled to the write-controller means, for generating a message to another port, the message including a row address of the embedded memory means that contains the packet written by the write-controller means;
read-controller means, coupled to the embedded memory means and to the token-controller means, for reading the packet from the embedded memory means at the row address contained in a message received by the token-controller means; and
message-bus means, coupled to the token-controller means for all ports, the message-bus means transferring the message generated by the token-controller means of an input port receiving a packet to an output port for transmitting the packet to the external node,
whereby the row address is transferred between ports using the message-bus means.

19. The switch for connecting network ports of claim 18 wherein the row address is a partial address identifying a physical row in the embedded memory means, wherein accesses within the row are faster page-mode accesses than accesses to other rows.

20. The switch for connecting network ports of claim 19 further comprising:

routing table means, in the embedded memory means, for storing routing entries, each routing entry containing a MAC or IP network address and a port identifier that identifies one of the output ports in the plurality of ports; and policy engine means, coupled to the routing table means, receiving a MAC or IP network address extracted from a header of a packet received by an input port, for finding a matching routing entry in the routing table means that has a MAC or IP network address that matches the network address extracted from a header of the packet, the policy engine means returning the port identifier from the routing entry that has the matching routing entry, whereby network addresses are searched in the routing table means.

* * * * *